(12) United States Patent
Kimura (10) Patent No.: US 9,864,159 B2
(45) Date of Patent: Jan. 9, 2018

(54) IMAGING DEVICE HAVING STRUCTURE USING ANCHOR MECHANISM

(71) Applicant: DENSO CORPORATION, Kariya, Aichi-pref. (JP)

(72) Inventor: Takayuki Kimura, Kariya-shi (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/901,936

(22) PCT Filed: Jul. 3, 2014

(86) PCT No.: PCT/JP2014/067745
§ 371 (c)(1),
(2) Date: Dec. 29, 2015

(87) PCT Pub. No.: WO2015/002257
PCT Pub. Date: Jan. 8, 2015

(65) Prior Publication Data
US 2016/0274326 A1 Sep. 22, 2016

(30) Foreign Application Priority Data

Jul. 3, 2013 (JP) .................................. 2013-140022

(51) Int. Cl.
*G02B 7/02* (2006.01)
*G03B 17/12* (2006.01)
*H04N 5/225* (2006.01)

(52) U.S. Cl.
CPC .............. *G02B 7/025* (2013.01); *G02B 7/02* (2013.01); *G02B 7/022* (2013.01); *G03B 17/12* (2013.01);
(Continued)

(58) Field of Classification Search
CPC ........ G02B 7/025; G02B 7/021; G02B 7/003; G02B 7/026; G02B 27/62; G02B 7/023;
(Continued)

(56) References Cited

U.S. PATENT DOCUMENTS

| 5,272,567 A * | 12/1993 | Inoue ...................... G02B 7/10 |
| | | 359/696 |
| 2003/0231406 A1* | 12/2003 | Sasaki ...................... G02B 7/02 |
| | | 359/703 |

(Continued)

FOREIGN PATENT DOCUMENTS

| JP | S56-77807 A | 6/1981 |
| JP | H07-168109 A | 7/1995 |

(Continued)

OTHER PUBLICATIONS

Machine Translation of Sato, (JP-2009031694A), as provided by espacenet, description and drawings sections. 17 Pages.*

(Continued)

*Primary Examiner* — Thomas K Pham
*Assistant Examiner* — Sharrief Broome
(74) *Attorney, Agent, or Firm* — Knobbe, Martens, Olson & Bear, LLP (57) ABSTRACT

The imaging device is constituted of a lens, an imaging device receiving the incident light and converting the incident light to be an electrical signal, a cylindrical member accommodating the lens, a holder holding the imaging device, a groove formed of an outer periphery surface of the cylindrical member and an inner periphery surface of the holder, an adhesive provided in the groove with the outer periphery surface and the inner periphery surface being contacted with each other, and an anchor mechanism provided in the groove, producing an anchor effect in combi- (Continued)

nation with the adhesive, thereby increasing the strength of a joint between the cylindrical member and the holder.

9 Claims, 8 Drawing Sheets

(52) U.S. Cl.
CPC ......... *H04N 5/2252* (2013.01); *H04N 5/2254* (2013.01)

(58) Field of Classification Search
CPC ........ G02B 7/028; G02B 13/001; G02B 7/02; G02B 7/08; G02B 7/022; G02B 7/04; G02B 27/646; G02B 7/09; G02B 13/003; G02B 23/2476; G02B 27/00
See application file for complete search history.

(56) References Cited

U.S. PATENT DOCUMENTS

| | | | | |
|---|---|---|---|---|
| 2008/0041954 | A1* | 2/2008 | Gannon | G06K 7/10732 235/454 |
| 2016/0097912 | A1* | 4/2016 | Kobori | H04N 5/2254 359/820 |

FOREIGN PATENT DOCUMENTS

| | | | | |
|---|---|---|---|---|
| JP | H09-243892 | A | | 9/1997 |
| JP | 2007-174358 | | | 7/2007 |
| JP | 2009-031694 | | * | 2/2009 ............... G02B 7/02 |
| JP | 2009-031694 | A | | 2/2009 |
| JP | 2009031694 | A | * | 2/2009 |
| JP | 2009-186756 | A | | 8/2009 |
| JP | 2012-123220 | A | | 6/2012 |
| WO | 2015/002257 | A1 | | 1/2015 |

OTHER PUBLICATIONS

Machine Translation of Sato, (JP-2009-031694A), as provided by espacenet, description and drawings sections. 17 Pages.*
International Search Report (translated version); International Application No. PCT/JP2014/067745, filed Jul. 3, 2014; 12 pages.
International Preliminary Report on Patentability; International Application No. PCT/JP2014/067745; Filed: Jul. 3, 2014 (with English translation).

* cited by examiner

IMAGING DEVICE HAVING STRUCTURE USING ANCHOR MECHANISM

CROSS REFERENCE TO RELATED APPLICATION

This application is based on and claims the benefit of priority from earlier Japanese Patent Application Nos. 2013-140022 filed on Jul. 3, 2013, the description of which is incorporated herein by reference.

BACKGROUND

Technical Field

The present disclosure relates to an imaging device generating an image in accordance with incident light entering through a lens and more particularly to a structure to fix the lens and structural members to the imaging device.

Background

Conventionally, for example, JP-A-2012-123220 discloses a cylindrical member that accommodates a lens and a holder member that holds structural components including the cylindrical member, being accommodated therein. In the structure according to the above patent document, a step is provided between the cylindrical member and the holder member and one end portion is caulked whereby the cylindrical member and the holder member are adjoined and fixed by an adhesive.

CITATION LIST

Patent Literature

[PTL 1] JP-A-2012-123220

However, according to the above-described structure, the cylindrical member and the holder member are merely adjoined by caulking and fixed to each other by an adhesive. Accordingly, a joint between the cylindrical member and the holder member is likely to be loosened due to high temperature or vibration, thereby causing a problem in durability.

SUMMARY

Hence it is desired to provide an imaging device capable of enhancing strength of the joint against the vibration. The imaging device of the present disclosure provides an enhanced joint between the cylindrical member and the holder so as to improve strength of the joint. The imaging device according to the present disclosure is provided with a lens; imaging means for converting incident light entering through the lens to a signal; a cylindrical member that accommodates the lens; a holder having a space inside thereof, accommodating the cylindrical member in the space inside thereof and holding the imaging means; a groove formed by a first joint surface and a second joint surface, the first joint surface being at least part of an outer periphery surface of the cylindrical member and the second joint surface being at least part of an inner periphery surface of the holder; the adhesive provided in the groove with the first joint surface and the second joint surface being contacted to each other, the adhesive joining the cylindrical member and the holder; and an anchor mechanism provided in the groove, producing an anchor effect in combination with the adhesive, thereby increasing strength of a joint between the cylindrical member and the holder.

According to the imaging device configured as described above, the adhesive is injected (coated) between the cylindrical member and the holder, thereby producing the anchor effect between the adhesive and the convex portion. As a result, the cylindrical member and the holder are rigidly adjoined. Further, the convex portion of the anchor joint structure is arranged as a stopper so as to avoid a force in a direction causing the cylindrical member and the holder to become loose, when the cylindrical member and the holder are loosened due to a vibration. Accordingly, when the vibration occurs, the joint between the cylindrical member and the holder can be prevented from being loosened so that the joint between the cylindrical member and the holder can rigidly be maintained. As a result, durability of the imaging device against high temperature and vibration applied thereto can be enhanced.

It should be noted that the descriptions in the claims can be voluntarily combined as much as possible. In this case, a part of configurations may be omitted as long as the effects of the present disclosure are obtained.

DETAILED DESCRIPTION OF EMBODIMENTS

With reference to the drawings, hereinafter, embodiments of the present disclosure are described.

(First Embodiment)

[Configuration of the Present Embodiment]

An imaging device 1 according to the present disclosure is configured as a camera that captures images on the basis of incident light entering through a lens 11. For example, the imaging device 1 is configured as an on-vehicle camera and is disposed in the vehicle cabin. Specifically, the imaging device 1 is disposed such that the lens 11 faces a glass side (windshield side) where the temperature increases high due to the influence of direct sunlight. Thus, according to the imaging device 1 of the present embodiment, the lens 11 is designed to have excellent durability even in a harsh environment due to high temperature and the occurrence of vibration.

Figure 1:
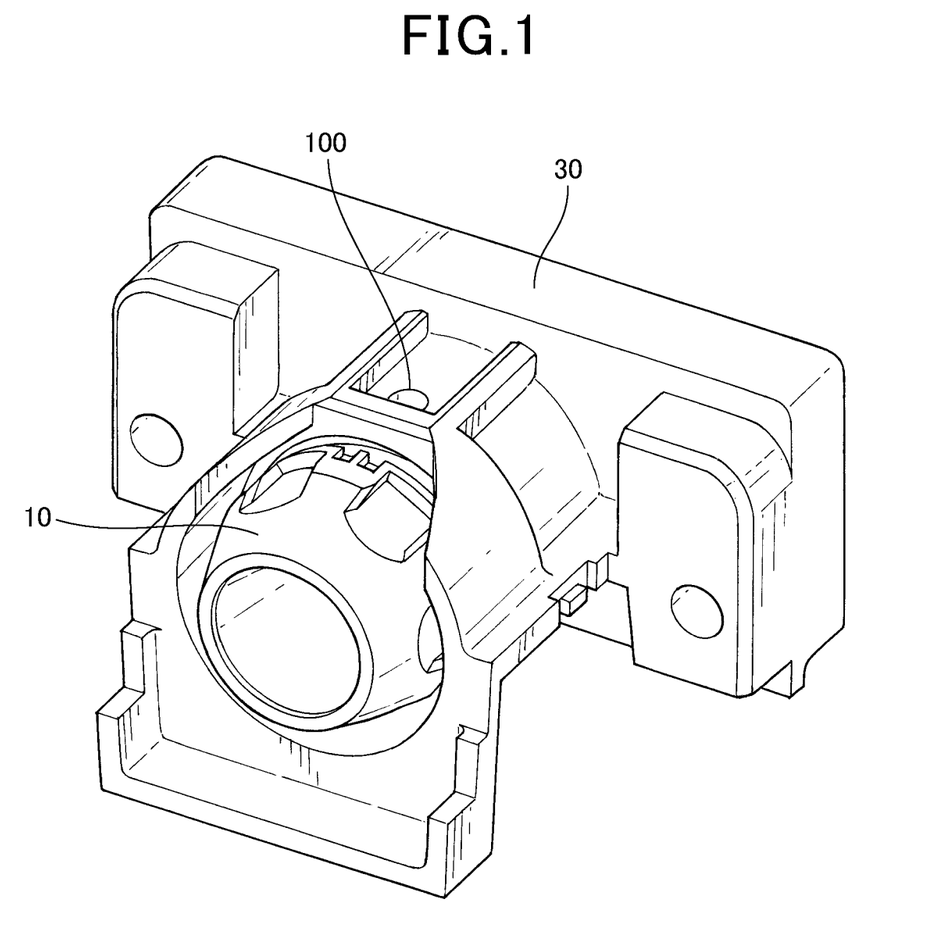
FIG. 1 is a perspective view showing an imaging device according to the present disclosure.
Figure 2:
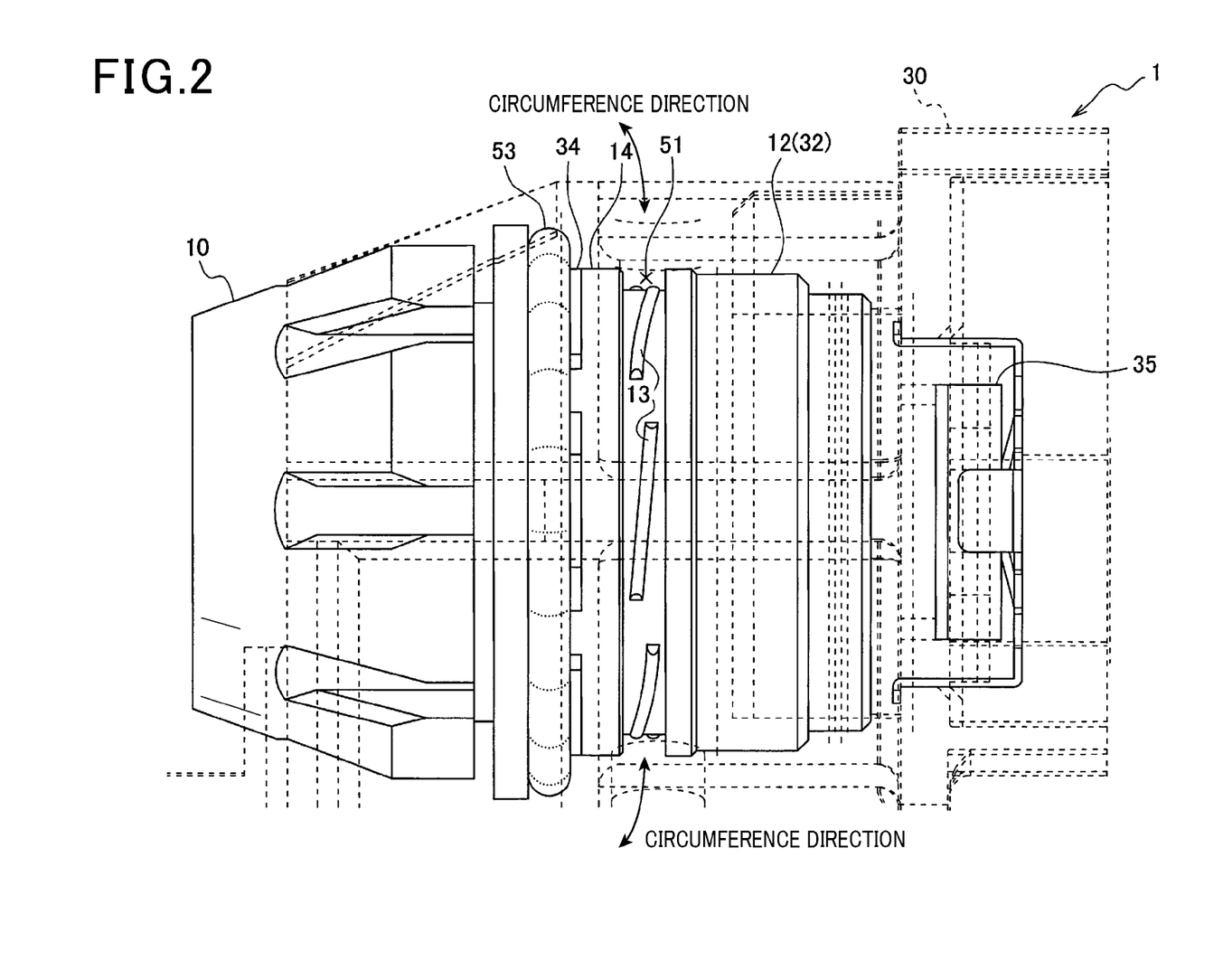
FIG. 2 is a side view showing a configuration of the imaging device according to a first embodiment.
Figure 3:
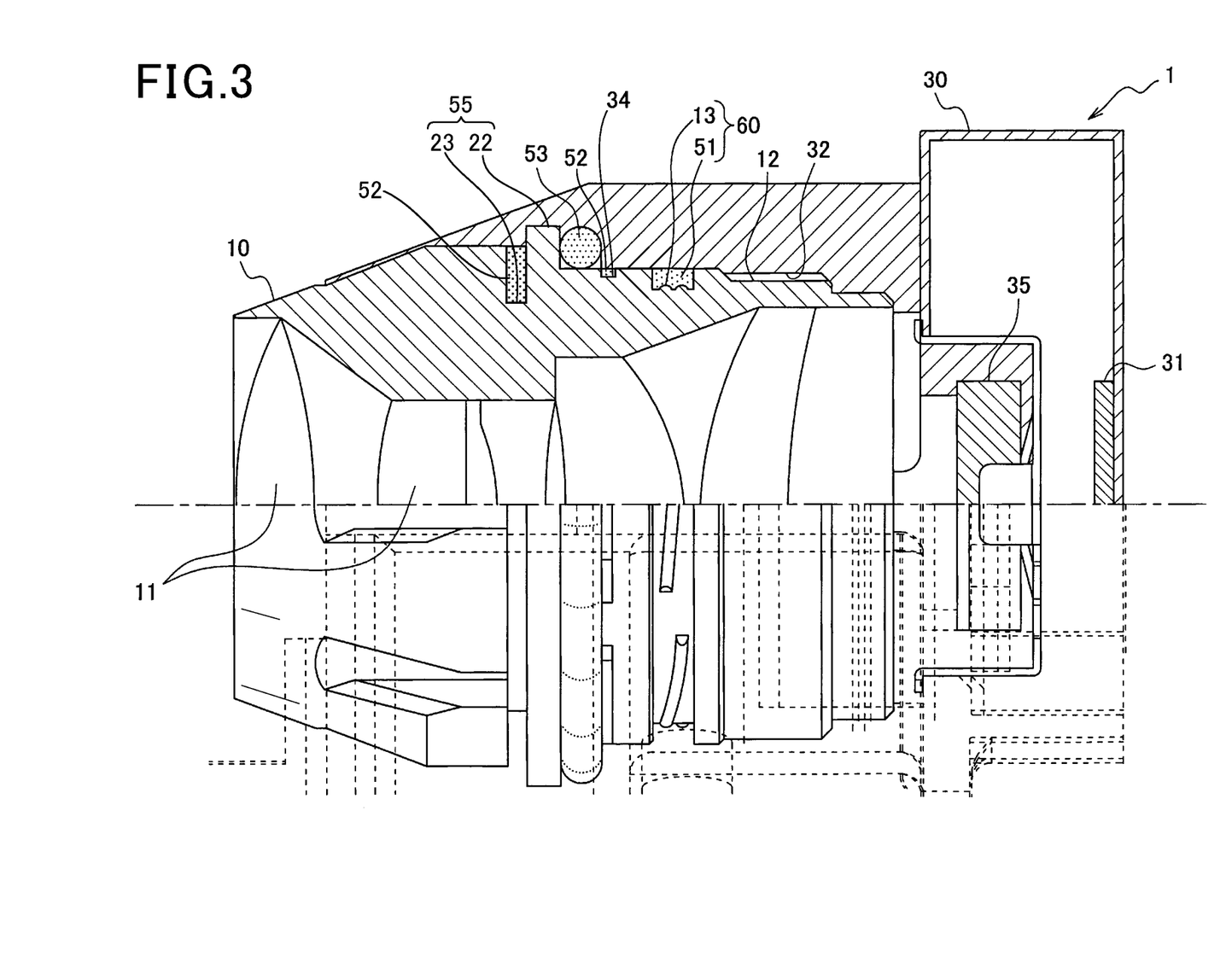
FIG. 3 is a central cross sectional view of the imaging device according to the first embodiment.

In more detail, as shown in FIGS. 1 to 3, the imaging device 1 according to the present embodiment is provided with a barrel 10 and a main body 30. The barrel 10 is a cylindrical member that accommodates lenses, including a plurality of lenses 11.

The main body 30 has a space inside thereof, holding the barrel 10 accommodated therein. The main body 30 also includes an optical filter 35 and a photodiode array 31. The optical filter 35 is configured as a filter (long pass filter) that allows long-wavelength components of the incident light entering through the lens to transmit therethrough. The incident light transmitted through the optical filter reaches the photodiode array 31. The photodiode array 31 is configured as a known imaging device provided with a large number of photodiodes, converting an incident light entering through the lens to a signal, e.g., electrical signal (imaging means).

The barrel 10 includes a male screw 12, a convex portion 13 and a groove 34. The convex portion 13 is formed along a circumference direction of the barrel 10 (first joint surface) to have an inverse thread structure with respect to a screw thread provided as the male screw 12 (i.e., a structure having spiral shape in a direction opposite to the screw thread of the male screw 12).

The main body 30 includes a female screw 32 which is screwed with the male screw 12 of the barrel 10, whereby the barrel 10 and the main body 30 are aligned and assembled.

A spigot portion 55 is provided at a protrusion 22 located adjacent to the groove 34 and a rubber packing 53 (described later) and at a groove 23. The design is prepared considering that the female screw 32 and the male screw 12 are screwed together, allowing a relative position between the barrel 10 and the main body 30 to move to an appropriate position. The positional relationship between the photodiode array 31 and the lens 11 is set by adjusting a state of screw between the female screw 32 and the male screw 12.

Further, in the barrel 10, the rubber packing 53 (O-ring) is provided in the vicinity of the groove 34. It is so designed that, as the screwing between the female screw 32 and the male screw 12 is advanced, the rubber packing 53 is sandwiched between the barrel 10 and the main body 30, thereby advancing the deformation. According to this configuration, the gap between the barrel 10 and the main body 30 is sealed by the rubber packing 53 so as to improve the waterproof properties.

Figure 8:
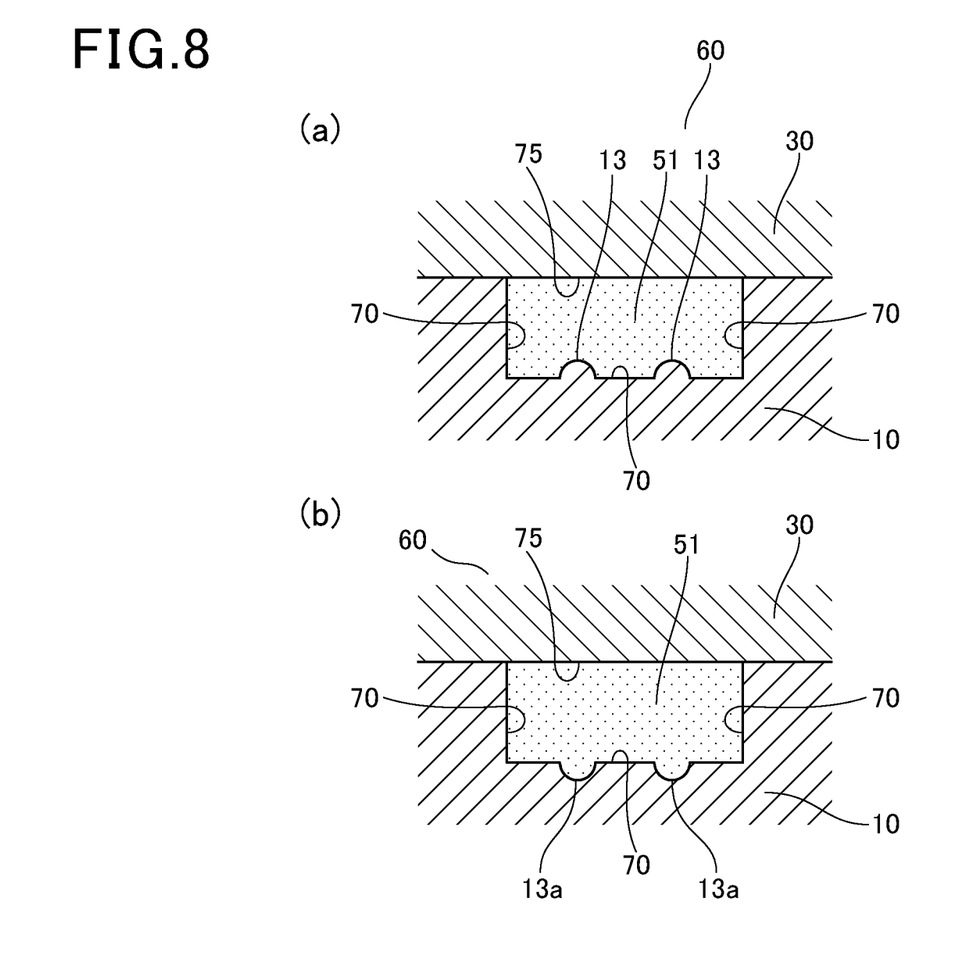
FIG. 8 is a set of explanatory diagrams each showing an enlarged anchor portion.

Under this condition, an adhesive 51 is injected (coated) between the barrel 10 and the main body 30, whereby the barrel 10 and the main body 30 are rigidly adjoined. In FIG. 3, the convex portion 13 and the adhesive 51 constitute an anchor portion 60 (described below). FIGS. 8 (*a*) and 8 (*b*) each show an enlarged view of the anchor portion 60. The convex portions 13 are provided in the anchor portion as shown in FIG. 8 (*a*). Concave portions are provided in the anchor portion 60 as shown in FIG. 8 (*b*). As shown in FIG. 8 (*a*), when the adhesive 51 is solidified, the anchor portion 60 (anchor mechanism) is formed with a groove, the convex portion 13 and the adhesive 51. The groove is formed with a joint surface 70 (first joint surface) which is a part of an outer peripheral surface of the barrel 10 where the convex portion 13 of the barrel 10 is formed and a joint surface 75 (second joint surface) which is a part of an inner peripheral surface of the main body 30. Specifically, a bonding area between the barrel 10 and the main body 30 increases between the adhesive 51 which has been solidified and the convex portion 13 to produce the anchor effect. As a result, the barrel 10 and the main body 10 can be rigidly adjoined. Further, according to the anchor portion 60, in the case where peeling occurs at a joint portion between the barrel 10 and the main body 30 due to the high temperature, with an application of a vibration of the main body to the joint portion, producing a force in a direction to loosen the female screw 32 and the male screw 12, a reactive force is produced in a direction to tighten the female screw 32 and the male screw 12. In other words, when the force is produced in a direction to loosen the female screw 32 and the male screw 12, the anchor portion 60 minimizes a degree of looseness between the female screw and the male screw, with the reaction force produced in a direction to tighten the female screw 32 and the male screw 12 (a resistant force equivalent to a force produced in a direction to loosen the female screw 32 and the male screw 12). In FIG. 3, the convex portions 13 are formed in the anchor portion 60. However, the above-mentioned anchor effect can be produced as well when concave portions are formed (FIG. 8(*b*)). The anchor effect refers to an effect in which an adhesive enters an uneven section of the joint surface and is solidified when being adjoined, thereby improving the adhesive strength.

An adhesive 52 is coated in the groove 34 as well. As the adhesives 51 and 52, for example, materials such as thermosetting resins, and epoxy-based resins can be used. Specifically, as an adhesive, materials having high tolerance against heat and vibration are preferably used. When an adhesive having such material is employed, a resin such as polyphenylene sulfide (PPS) having high adhesive effect is high is preferably used for the barrel 10 and the main body 30.

Moreover, the adhesives 51 and 52 may be coated before assembling the barrel 10 and the main body 30. According to the present embodiment, the main body 30 includes an inlet 100 of adhesive (adhesive-injecting port) used for the adhesives 51 and 52. The adhesives 51 and 52 may be injected through this inlet, after the barrel 10 and the main body 30 are assembled.

[Effects of the Present Embodiment]

The imaging device 1 as described in detail is provided with the barrel 10 that accommodates the lens, the main body 30 that holds structural members of the imaging device 1 including the barrel 10, being accommodated therein. The adhesive 51 is injected (coated) between the barrel 10 and the main body 30, thereby producing the anchor effect between the adhesive 51 and the convex portion 13. As a result, the barrel 10 and the main body 30 are rigidly adjoined.

For the barrel 10 and the main body 30, the female screw 32 provided at either the barrel 10 or the main body 30 (main body 30 according to the present embodiment) is screwed to the male screw 12 provided at the other one of the barrel 10 and the main body 30 (barrel 10 according to the present embodiment), and the adhesives 51 and 52 are coated between the barrel 10 and the main body 30, whereby the barrel 10 and the main body 30 are adjoined.

According to the imaging device 1 configured as described above, the barrel 10 and the main body 30 are aligned by screwing the male screw 12 and the female screw 32 and adjoined with the adhesives 51 and 52. Further, since the anchor portion 60 produces a force towards a direction to tighten the female screw 32 and the male screw 12 when the female screw 32 and the male screw 12 are loosened, the positional relationship between the barrel 10 and the main body 30 can rigidly be maintained. As a result, a durability of the joint between the barrel 10 and the main body 30 in the imaging device 1 against high temperature and vibration can be enhanced.

Also, in the above-described imaging device 1, the anchor portion 60 is configured to include the convex portion on at least either the barrel 10 or the main body 30, having an inverse thread structure with respect to a screw thread provided as the male screw 12 and the female screw 32, and the adhesive 51 is solidified in the convex portion 13.

According to the imaging device 1 configured as described above, the solidified adhesive 51 and the convex portion 13 are adhered. Therefore, when the screw-state is loosened, a force can be produced in the direction to tighten the screw-state.

Further, since the imaging device 1 includes the spigot portion 55, the barrel 10 and the main body 30 can be aligned by this spigot portion 55.

According to the imaging device 1 configured as described above, by using the spigot portion 55, the barrel 10 and the main body 30 can readily be aligned when being assembled. Furthermore, according to the above-described imaging device 1, the adhesive 52 can be coated in the spigot portion 55.

According to the imaging device 1 configured as described above, the adhesive 52 is coated to the spigot portion 55 as well. Hence, the bonding area can be increased so that the barrel 10 and the main body 30 can more rigidly be maintained.

(Second Embodiment)

Figure 4:
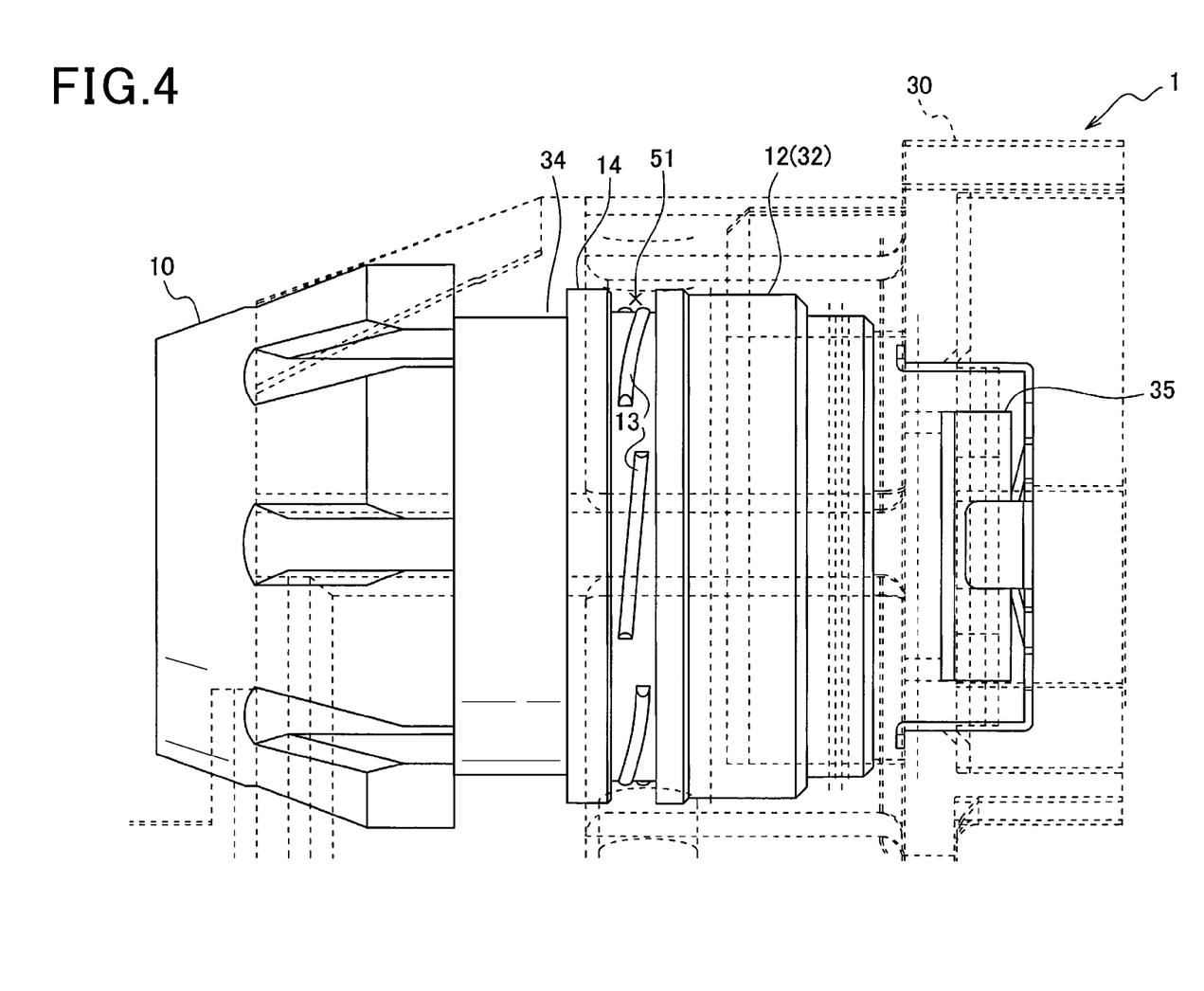
FIG. 4 is a side view showing a configuration of the imaging device according to a second embodiment.
Figure 5:
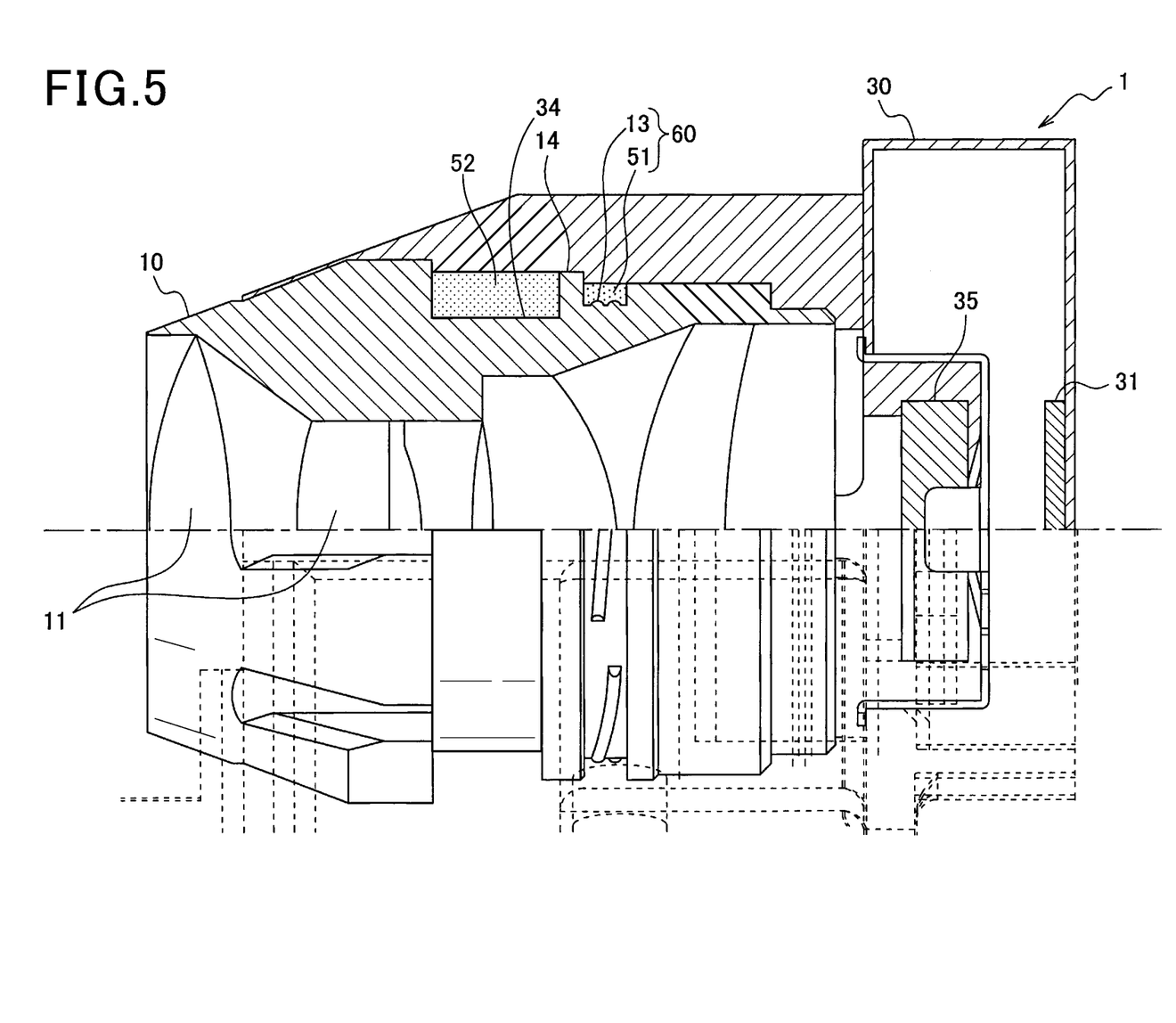
FIG. 5 is a central cross sectional view of the imaging device according to the second embodiment.

Hereinafter, with reference to FIGS. 4 and 5, the second embodiment will be described, focusing on differences from the above-described first embodiment. FIG. 4 is a side view showing a configuration of an imaging device according to the present embodiment. FIG. 5 is a central cross sectional view showing the imaging device according to the present embodiment. According to the present embodiment, the male screw 12 and the female screw 32 are not used. Alternatively, the barrel 10 and the main body 30 are rigidly adjoined by the anchor portion 60 formed with the convex portion 13 in combination with the adhesive 51 being solidified. Similar to the first embodiment, in the anchor portion 60, a bonding area between the barrel 10 and the main body 30 increases between the solidified adhesive 51 and the convex portion 13 to produce the anchor effect. Moreover, the convex portion 13 of the anchor portion 60 is arranged as a stopper so as to avoid a force in a direction of causing the barrel 10 and the main body 30 to become loose, when being loosened because of peeling occurring due to a high temperature at a joint portion in the convex portion 13 of the anchor portion 60, with an application of a vibration of the main body to the joint portion. In other words, to make a direction to be different from the direction (circumference direction of the barrel and the main body) of the force causing looseness, the longitudinal direction of the convex portion 13 is arranged to intersect the direction of the force causing looseness. Hence, the convex portion 13 serves as the stopper to avoid the force causing looseness. Specifically, since the convex portion 13 is protruded from the joint surface 70 between the barrel 10 and the main body 30, when the joint portion peels off due to high temperature or the like, a surface (protruded surface) where the adhesive layer in the joint is protruded from the joint surface 70 of the convex portion 13 becomes a resistance, thereby serving as a stopper avoiding a movement thereof towards the direction of the force causing looseness. Further, the barrel 10 and the main body 30 are aligned with a protrusion 14 provided in the barrel 10 and the groove 34 of which the width is extended in the longitudinal direction of the imaging device compared to the one in the first embodiment, and the adhesive 52 is coated (injected) thereto similar to the first embodiment, whereby the imaging device of the present embodiment is assembled. According to the present embodiment, since the male screw and the female screw are not used, the rubber packing 53 (O-ring) is not used. To secure the waterproof properties between the barrel 10 and the main body 30, a rubber packing may be used in the present embodiment.

[Effects of the Present Embodiment]

The imaging device 1 according to the present embodiment is provided with the barrel 10 that accommodates the lens, and the main body 30 that holds structural members of the imaging device 1, including the barrel 10, being accommodated therein. The adhesive 51 is injected (coated) between the barrel 10 and the main body 30 to produce an anchor effect between the adhesive 51 and the convex portion 13, whereby the barrel 10 and the main body 30 are rigidly adjoined. Furthermore, the convex portion 13 of the anchor portion 60 is arranged as a stopper so as to avoid a force in a direction of causing the barrel 10 and the main body 30 to become loose, when the barrel 10 and the main body is loosened due to a vibration. Accordingly, when vibration occurs, the joint between the barrel 10 and the main body 30 can be prevented from being loosened so that the joint between the barrel 10 and the main body 30 can rigidly be maintained. As a result, durability of the imaging device 1 against vibration applied thereto can be enhanced. Also, the width of the longitudinal direction of the grove 34 is extended so that the bonding area when adhesive is coated can be larger compared to the first embodiment. Hence, the barrel 10 and the main body 30 can more rigidly be adjoined. Since there is no need of providing the O-ring, the number of components when manufacturing the imaging device can be reduced, and thus the manufacturing cost can be reduced as well.

(Third Embodiment)

In the present embodiment, the shape of the convex portion 13 differs from that of the above-described second embodiment and the other configurations are the same as the ones in the second embodiment. In the present embodiment, as shown in a set of drawings of FIG. 6, the convex portion 13 having a function as a stopper is modified to various shapes. The various shapes (1) to (7) as shown in the drawings are described as follows.

Figure 6:
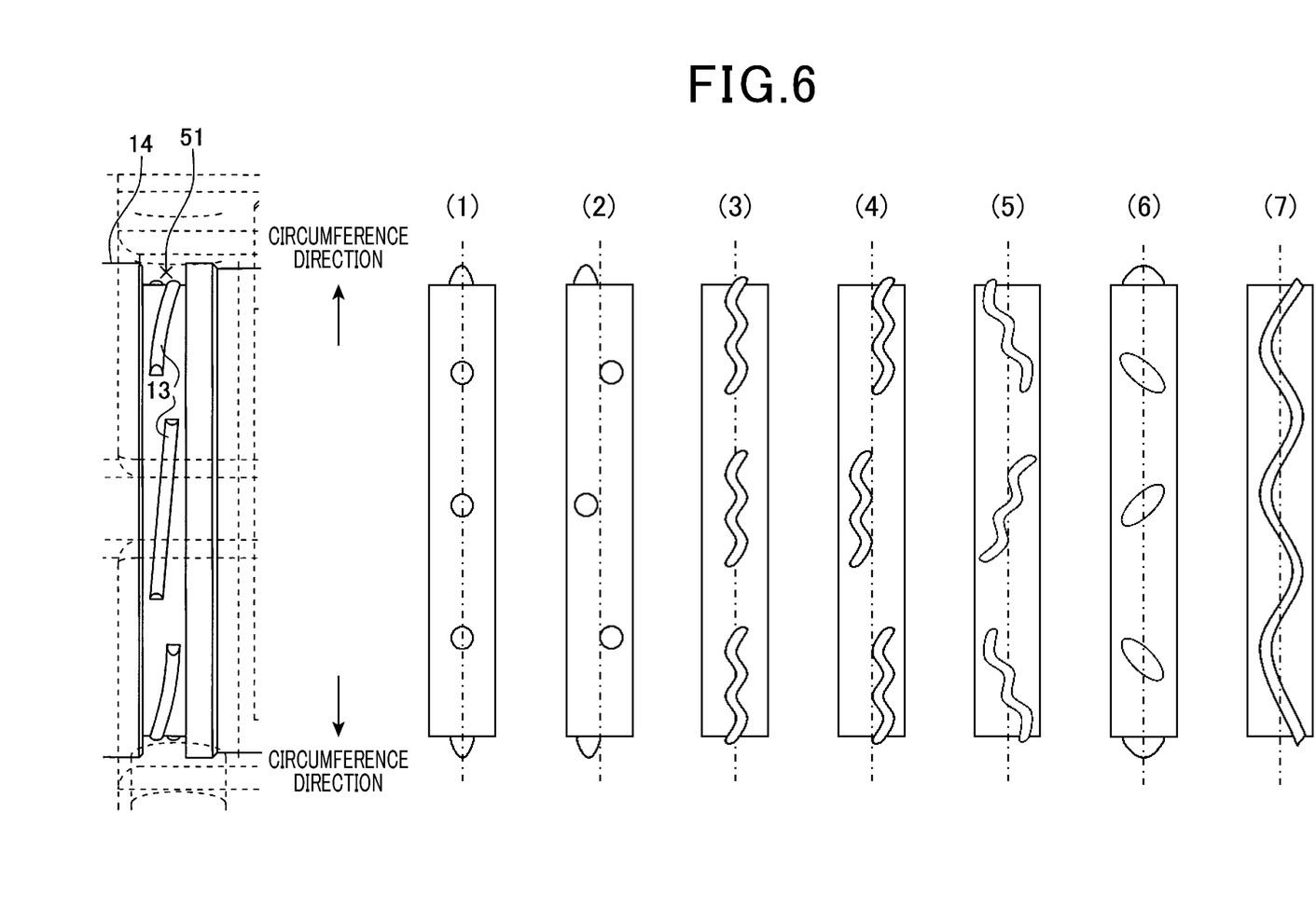
FIG. 6 is a set of diagrams showing a variation of convex portions according to a third embodiment.

(1) A plurality of convex sections each having a circular shape are arranged in a circumference direction of the barrel with predetermined intervals therebetween so as to be located on the center line (shown by dashed line) of the convex portion 13.

(2) A plurality of convex sections each having a circular cross section are arranged in the circumference direction of the barrel with a predetermined intervals therebetween so as to be located at the right side and the left side with respect to the center line (shown by dashed line) of the convex portion 13.

(3) A plurality of convex sections each having a wave-like shape are arranged in the circumference direction of the barrel with predetermined intervals therebetween so as to be located on the center line (shown by dashed line) of the convex portion 13.

(4) A plurality of convex sections each having a wave-like shape are arranged in the circumference direction of the barrel with predetermined intervals therebetween at the right side and the left side with respect to the center line (shown by dashed line) of the convex portion 13.

(5) Convex sections each having wave-like shape are arranged in the circumference direction of the barrel with predetermined intervals therebetween so as to intersect the center line (shown by dashed line) of the convex portion 13 at a predetermined angle.

(6) Convex sections each having an elliptical cross section are arranged in the circumference direction of the barrel with constant intervals therebetween so as to intersect the center line (shown by dashed line) of the convex portion 13 at a predetermined angle.

(7) A single convex section having a wave-like shape is arranged on the center line (shown by dashed line) of the convex portion 13 such that the single convex section continuously intersects the center line at a predetermined angle.

As shown in FIGS. 6 (1) to (7), it is apparent that the respective convex portions 13 (anchor portions) are protruded from the joint surface 70 of the barrel 10. In other words, there is provided a surface protruded from the joint surface 70 when viewed from the joint surface 70 in the circumference direction. This protruded surface is arranged such that the convex portion 13 intersects the circumference direction of the barrel 10 (shown by dashed line in FIGS. 6 (1) to (7)).

[Effects of the Present Embodiment]

The shape of the convex portion 13 can be modified to have various shapes, whereby the bonding area is increased so that anchor effect produced between the adhesive and the convex portion can be enhanced and strength of the joint between the barrel 10 and the main body 30 can be further enhanced. Moreover, since the protruded surface serves as a resistance of the adhesive layer, the function as a stopper can be further enhanced.

(Fourth Embodiment)

Figure 7:
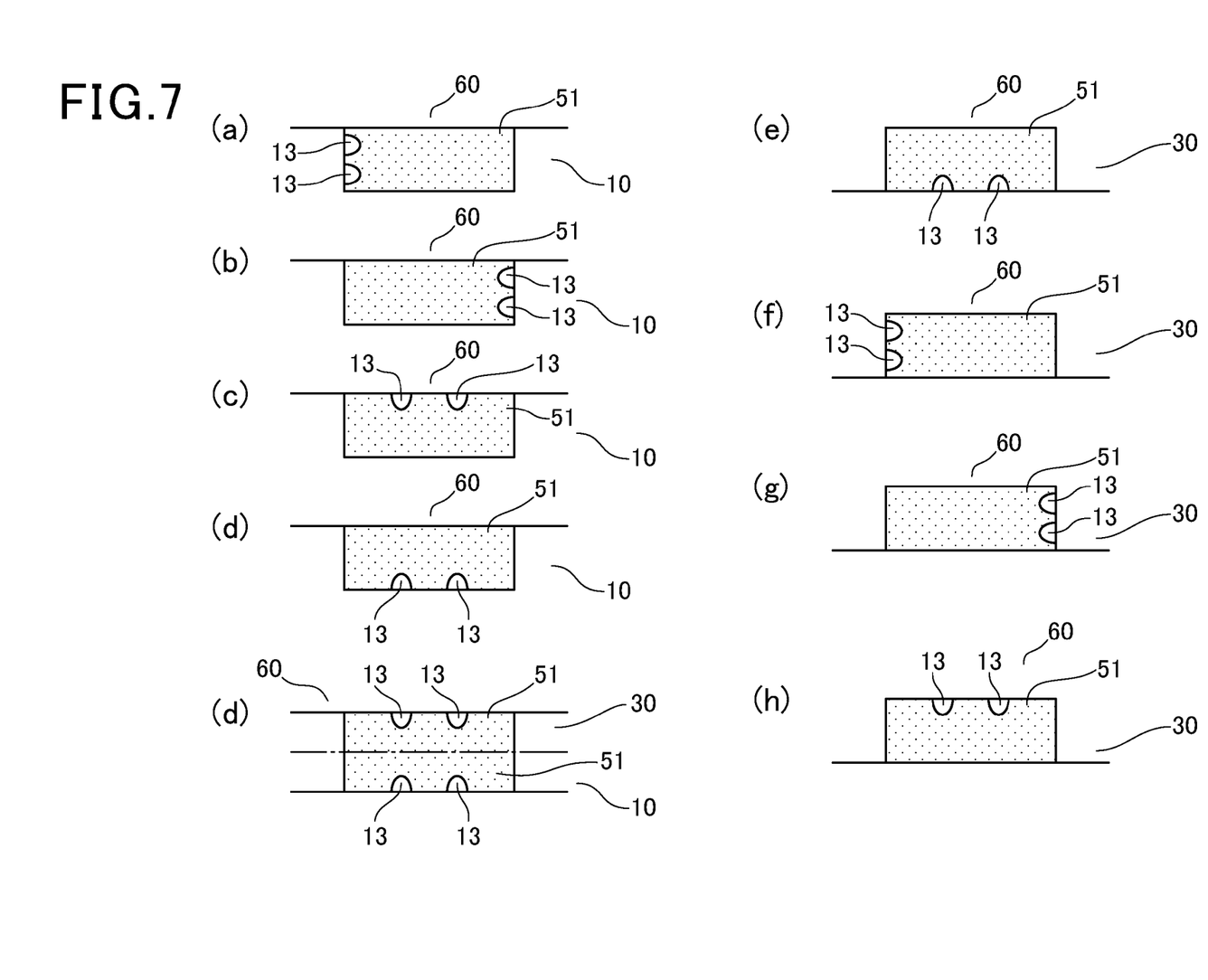
FIG. 7 is a set of diagrams showing a variation of locations where the convex portions are arranged according to a fourth embodiment.

FIG. 7 is a set of diagrams showing an arrangement variation of the convex portion. According to the present embodiment, the anchor portion 60 is arranged in locations different from the ones of the first to third embodiments. However, other configurations are the same as the ones of the first to third embodiments. As shown in FIG. 7, in the present embodiment, the anchor portion 60 is arranged at the main body 30 (FIG. 7 (*e*)-(*h*)) in addition to the arrangement example of the barrel 10 (FIG. 7 (*a*) to (*d*)). According to this arrangement of the anchor portion 60, anchor effect similar to the one described in the above-described embodiments can be obtained, and the barrel 10 and the main body 30 can rigidly be adjoined. Also, the convex portion is arranged on either one of joint surfaces 70 and 75 in the anchor portion 60. The anchor portion 60 can be arranged across the barrel 10 and the main body 30 such that the convex portion 30 can be arranged on either one of barrel 10 or main body 30 or arranged on both barrel 10 and main body 30 (FIG. 7 (*i*)). By these arrangements, the joint portion can be appropriately prevented from being weakened due to vibrations applied to the imaging device from various directions.

[Other Embodiments]

The present disclosure is not limited to the above-described embodiments. Moreover, a part of configurations in the above-described embodiments can be omitted as long as the problem is solved. As an embodiment, the above-described plurality of embodiments can be appropriately combined. It is understood that widely different embodiments can be made without departing from the scope of the present disclosure as defined in the appended claims. Moreover, reference signs used in the above-described embodiments are also used in the scope of claims for better understanding of the invention according to the claims. However, the reference signs are not used to limit the technical scope of the invention.

For example, according to the above-described embodiments, the anchor portion 60 is configured to have an effect of an inverse thread and an anchor effect due to a relationship between the convex portion 13 and the adhesive 51. However, instead of using the convex portion 13, a concave portion formed as a concave at the barrel 10 or the main body 30 may be used. The convex portion 13 or the concave portion 13*a* as an inverse thread structure, and the convex portion 13 and the concave portion 13*a* as an anchor portion can be individually and separately provided.

Further, in the above-described embodiments, the barrel 10 is configured to have a circular-cylindrical shape. However, a cylindrical member having any shape can be used for the barrel 10.

[Correspondence Between a Configuration of the Present Embodiments and a Configuration of the Present Disclosure]

The barrel 10 in the above-described embodiments corresponds to the cylindrical member and the main body 30 of the above-described embodiments corresponds to a holder of the present invention. The convex portion 13 (concave portion 13*a*) of the above-described embodiments corresponds to the anchor and the inverse thread of the present disclosure. Also, the anchor portion 60 of the above-described embodiments corresponds to an anchor mechanism. The joint surface 70 of the above-described embodiments corresponds to a first joint surface, and the joint surface 75 corresponds to a second joint surface.

REFERENCE SIGNS LIST

1: imaging device
10: barrel
11: lens
12: male screw
13: convex portion
14: protrusion
30: main body
31: photodiode array
32: female screw
34: groove
35: shutter device
51: adhesive
52: adhesive
53: rubber packing
55: spigot portion
60: anchor portion
70: first joint surface
75: second joint surface
80: first side surface
85: second side surface
100: inlet

The invention claimed is:

1. An imaging device comprising:
a lens;
imaging means for converting incident light entering through the lens to a signal;
a cylindrical member that accommodates the lens;
a holder having a space inside thereof, accommodating the cylindrical member in the space inside thereof and holding the imaging means;
a groove formed of a first joint surface and a second joint surface, the first joint surface being at least a part of an outer peripheral surface of the cylindrical member and the second joint surface being at least a part of an inner peripheral surface of the holder;
a female screw provided at one side between the cylindrical member and the holder;
a male screw provided at the other side between the cylindrical member and the holder;

an adhesive provided in the groove with the first joint surface and the second joint surface being contacted to each other, the adhesive joining the cylindrical member and the holder; and an anchor mechanism provided in the groove, producing an anchor effect in combination with the adhesive, the anchor effect being produced at a joint between the cylindrical member and the holder wherein the cylindrical member and the holder are adjoined by screwing together with the female screw and the male screw;

the anchor mechanism is provided at at least one of the cylindrical member and the holder, avoiding looseness between the female screw and the male screw with a reactance force produced in a direction to tighten the female screw and the male screw, when a force is produced in a direction to loosen the female screw and the male screw; and the anchor mechanism is configured by an inverse thread and the adhesive which is solidified in the inverse thread, the inverse thread shows a convex portion or a concave portion as an inverse thread structure with respect to a screw thread provided as the male screw and the female screw.

2. The imaging device according to claim 1, wherein the anchor mechanism has at least one anchor, the groove has a length being extended in a circumference direction of the cylindrical member, and the at least one anchor has a surface that intersects a direction of the length of the groove.

3. The imaging device according to claim 1, wherein the cylindrical member and the holder are made of resin.

4. The imaging device according to claim 1, wherein the holder includes an adhesive-injecting port.

5. The imaging device according to claim 1, wherein a spigot portion is provided, wherein a protrusion provided at one side between the cylindrical member and the holder, along a joint surface between the cylindrical member and the holder, is engaged to a groove provided at the other side between the cylindrical member and the holder, whereby the cylindrical member and the holder member are aligned.

6. The imaging device according to claim 5, wherein an adhesive is coated to the spigot portion.

7. The imaging device according to claim 1, wherein the anchor is formed in a circular shape.

8. The imaging device according to claim 2, wherein the anchor is formed in wave shape.

9. The imaging device according to claim 2, wherein the anchor is formed in an elliptical shape.

* * * * *